United States Patent [19]
Kobata et al.

[11] Patent Number: 6,098,180
[45] Date of Patent: Aug. 1, 2000

[54] ROBUST DELIVERY SYSTEM

[75] Inventors: Hiroshi Kobata, Brookline; Theodore G. Tonchev, Cambridge, both of Mass.

[73] Assignee: e-Parcel, LLC, Newton, Mass.

[21] Appl. No.: 08/804,114

[22] Filed: Feb. 18, 1997

[51] Int. Cl.$^7$ .................................................. G06F 13/00
[52] U.S. Cl. .............................................. 714/18; 371/32
[58] Field of Search ................................. 371/32; 714/18

[56] References Cited

U.S. PATENT DOCUMENTS

| | | | |
|---|---|---|---|
| 4,630,108 | 12/1986 | Gomersall | 358/84 |
| 5,457,680 | 10/1995 | Kamm et al. | 370/17 |
| 5,768,528 | 6/1998 | Stumm | 395/200.61 |
| 5,812,784 | 1/1995 | Watson et al. | 395/200.75 |
| 5,913,040 | 6/1999 | Rakavy et al. | 395/200.62 |

FOREIGN PATENT DOCUMENTS

| | | | |
|---|---|---|---|
| 0 862 304 A2 | 9/1998 | European Pat. Off. | H04L 29/06 |
| 5-022382 | 8/1994 | Japan . | |
| 6-150217 | 1/1996 | Japan . | |

OTHER PUBLICATIONS

"Protocol Handbook for Personal Computer/Data Communication," published by the Asahi Newspaper (Japan) in 1985. (Japanese Version Only).

"ITU–T White Book." (Japanese Version Only).

"Data Communication Networks: Services and Facilities, Interfaces," CCITT (The International Telegraph and Telephone Consultative Committee) (1989).

*Primary Examiner*—David Y. Eng
*Attorney, Agent, or Firm*—Testa, Hurwitz & Thibeault, LLP

[57] ABSTRACT

A system is provided for the safe transfer of large data files over an unreliable network link in which the connection can be interrupted for a long period of time. In the subject system, the sender sends a file with a unique signature which is recognized by the receiver, with the signature providing information as to file size. Upon the occasion of an interrupted communication over the link, the receive side waits for another connection. Upon the establishment of the connection, the receive side recognizes the signature of the file as the file which was being transmitted at the time of the interruption and requests blocks of data from the sender from the point at which the interruption occurred, with the point being established by the file size and the time of the interruption. The result is a restartable transfer of the transmission of information from the sender to receiver from the place where it left off, thus eliminating the annoyance of having to restart the transmission from the beginning.

21 Claims, 2 Drawing Sheets

Microfiche Appendix Included
(3 Microfiche, 202 Pages)

ROBUST DELIVERY SYSTEM

FIELD OF INVENTION

A program listing of the invention, written in the C++ programming language, is provided in the Microfiche Appendix, which includes three microfiche having a total number of 202 frames.

This invention relates to the transfer of information from a sender to a receiver over the internet and, more particularly, to a robust delivery system in which interrupted information transfer can be reestablished without the necessity of resending the entire file.

BACKGROUND OF THE INVENTION

It will be appreciated that due to capacity and other problems with respect to the internet, internet connections are often lost during the transfer of files from sender to receiver or, alternatively, from server to client. This type of interruption is exceedingly annoying due to the fact that a large amount of the information may have already been transmitted at the time of the interruption. Current systems do not allow for the transmission of only information that occurred after the interruption, but rather require that the entire file be transferred from its beginning. In the past, information transfer from sender to receiver over the internet was accomplished in blocks or packets of information. The blocks were not transferred with interrupted links in mind, but were rather coded with information for flow control to accommodate bandwidth limitations or usable bandwidth associated with capacity of network switches to store and transmit data. Flow control systems have been utilized both in synchronous and asynchronous systems to be able to accommodate switches and to recognize when buffer space, either at a switch or at the recipient, was incapable of responding adequately to the inflow of information.

In the case of the transfer of large files such as MPEG or JPEG in which images are to be transmitted from the sender to receiver, interruption of the link may result in the necessity of transmitting the entire image. Depending on the size of the image and its complexity, it may take 18 to 20 minutes to be able to transfer the file to the receive side. If the interruption occurs close to the end of the transmission, it would be convenient to be able to restart the transmission and not have to transmit data that has already been received.

The problem is exceedingly severe in the transmission of video images. It is desirable, bandwidth available, to be able to transmit realtime video across the internet. However, due to bandwidth limitations, this is neither practical now nor in the future for high quality video transmission to be transmitted on a real-time basis. As a result, it takes long periods of time to transmit video images. As a result, the loss of a link during a video transmission results in a major disruption at the receive side, with the interruption causing more problems than the limited bandwidth of the network due to the requirement of restarting the entire process during a communications outage. Moreover, due to the increasing usage of the internet, oftentimes with multiple users, the amount of interruption increases. For a single server serving as many as 200–500 clients, interruptions are frequent, with there being no convenient way, presently, to overcome the restart problem.

Moreover, for those systems in which the client side can interrupt the server side upon sensing of excessive load, this constitutes an interruption which nonetheless must be compensated for when it is appropriate to reestablish the connection.

One such client-side interruption system is described in U.S. patent application Ser. No. 08/755,029, filed by Hiroshi Kobata on Nov. 22, 1996. Here, a system for regulating the time of transmission of information from a server to a client is described in which network occupation is sensed and the transmission is caused to cease when insufficient bandwidth is available. Whether the interruption of a large file is caused by sensing network overload by the particular client or server, or whether it is due to network breakdowns, the problem is still the same. Large files must be restarted from the beginning.

SUMMARY OF THE INVENTION

In order to be able to start the transmission of information in a large file after the link has been interrupted, in the subject invention, a signature is transmitted along with the file in which the signature includes the length of the file. This signature is detected at the receive side where it is stored. Upon interruption of the communications link, the receive side waits again for the establishment of a connection and for the particular unique signature which is transmitted from the send side to the receive side. In order for information to be transmitted from the send side to the receive side, there must be a request of a block of information from the receive side to the send side which allows the receive side to control which parts of the file are to be transmitted. Since the receiver, due to the signature, knows the length of the file transmitted and when the transmission was interrupted, it is relatively easy, upon sensing an interrupt, to have the sender start sending those packets or blocks which are a given distance from the start of the file. As a result, it is part of the subject system that the receive side requests only those parts of the file which it does not have in memory.

It will be appreciated that this system permits simplification of the send side due to the fact that the send side need not store information about the transfer state. Rather, the send side merely starts up its transmission of only the blocks requested by the receive side. This permits a simplified unidirectional communications link in which the control signals for the transmission of data are generated at the receive side without any interaction with the send side.

In summary, a system is provided for the safe transfer of large source files over an unreliable network link in which the connection is interrupted for a long period of time. In the subject system, the sender sends a file with a unique signature which is recognized by the receiver, with the signature providing information as to file size. Upon the occasion of an interrupted communication over the link, the receive side waits for another connection. Upon the establishment of the connection, the receive side recognizes the signature of the file as the file which was being transmitted at the time of the interruption and requests blocks of data from the sender from the point at which the interruption occurred, with the point being established by the file size and the time of the interruption. The result is a restartable transfer of the transmission of information from the sender to receiver from the place where it left off, thus eliminating the annoyance of having to restart the transmission from the beginning.

BRIEF DESCRIPTION OF THE DRAWINGS

These and other features of the subject invention will be better understood taken in conjunction with the Detailed Description in conjunction with the Drawings of which.

DETAILED DESCRIPTION

Figure 1:
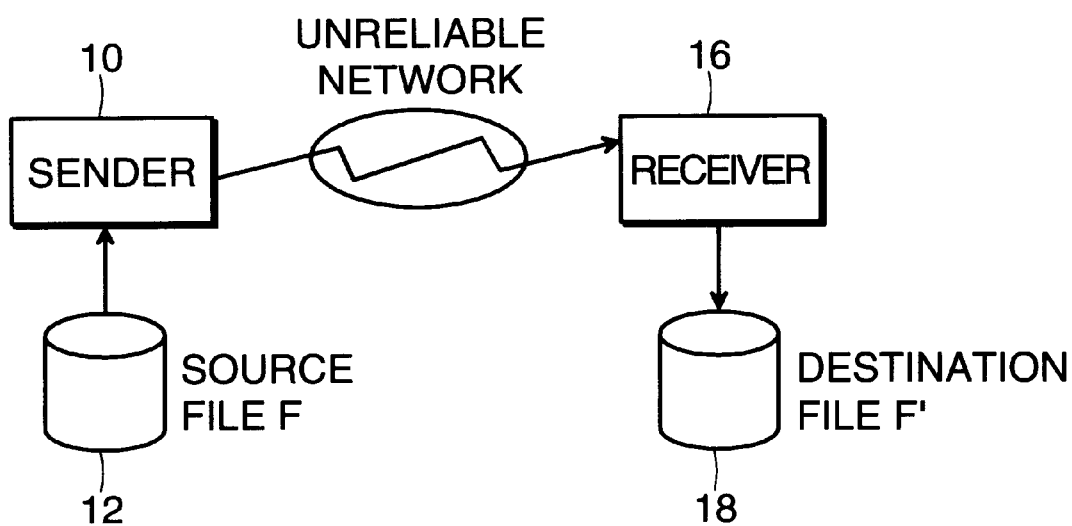
FIG. 1 is a block diagram of the subject system illustrating the effect of an unreliable network; and, FIG. 2 is a flow chart of the subject system indicating the utilization of signatures to uniquely identify a file as to the name, size, and date.

Referring now to FIG. 1, a sender 10 at the send side transmits the contents of a file 12 over a network 14 to a receiver 16 which stores the information locally at 18. Storage 18, as will be seen in connection with FIG. 2, includes a database of records representing partially downloaded files with each record having an associated file signature, a file handle and a position representative of the number of bytes received.

The purpose of the subject system is to provide the signature, in one embodiment at the header, every time that the file is to be transferred. Thus the objective is to transfer a File F over an unreliable network link. Given two computers connected over a network link, one computer, the sender, must transfer a large file to the other computer, the receiver, over the network link.

As mentioned hereinbefore, the largest of the files currently to be transferred are MPEG files which refers to motion picture and coding group, which is a format that is typically used for the transfer of such data. Other large format files include such files WAVI, which refers to audio/video files; AU, which is an audio format; and AVI, which is a video format.

Figure 2:
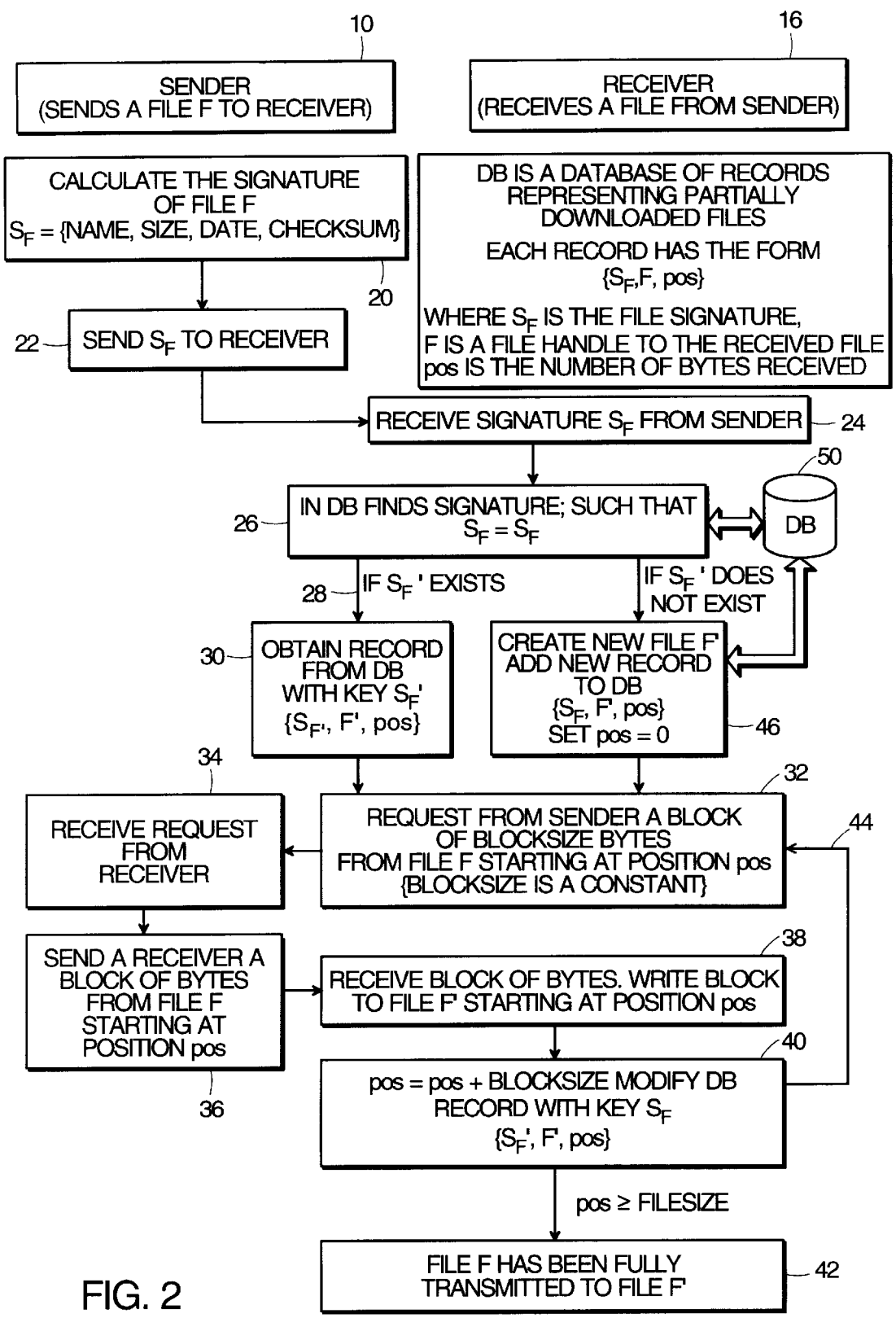

Referring now to FIG. 2, in one embodiment, sender 10 seeks to send a File F to receiver 16. In order to do so, means at the sender calculate the signature of File F, which, in one embodiment, includes the name, size, date and check sum unique to this file. This is accomplished at calculation module 20 which is coupled to a transmit module 22 which sends the file $S_f$ to the receiver. At the receiver, means 24 are provided to strip off the signature of the file, whereas at 26 within the database, the signature is matched to the stored signatures such that if a match exists, as illustrated at 28, then the records are obtained from the database with the key, $S_f'$, F', and POS, as illustrated at 30. In short, [$S_f'$, F', POS] refers to the record containing a signature matching that of the transmitted data. In such a case, there is a request from the sender at 32 for a block of information in block size bytes from File F starting at Position POS. Note that the block size is constant, such that when this request is received at 34 by the sender, the sender transmits a block of bytes from File F starting at Position POS as illustrated at 36.

It will be appreciated that while the above is described with block size being constant, this does not necessarily have to be the case.

Upon receipt of a request from the receiver, the send side transmits the above-identified data which is received at 38 in which a block of bytes that are received are written into file F' starting at Position POS.

As shown at 40, on the receive side, the database record is modified with the key $S_f$ to [$S_f$, F', POS].

If the position is greater than the transmitted file size from the signature, then File F has been fully transmitted to File F' as illustrated at 42.

If not, as illustrated by line 44, a further request is initiated on the receive side and transmitted to the send side for a further block of bytes from File F starting at the position denoting the end of the last block that has been received at the receive side.

If, in the database, $S_f'$ does not exist, then as illustrated at 46, a new record is added to the database in the form [$S_f$, F', 0] with the position being set to zero. The result of this is that there is a request from the receive side indicating that no data exists at all at the receive side and that the send side should commence transmitting the file in question.

It will be appreciated that there is a database 50 which is coupled to the system at the receive side to enable the query of the database as to whether or not there is a signature of the file that has already been entered into the database. The database is also coupled to the block 46 which loads a vector indicating the new file into the database.

There is also a connection between the database and block 40 which updates the state of the current and transferred file so as to indicate that new data has been received. As a result, the receive side will not generate a request to the send side for data that has already been received.

The subject system thus not only provides for the robust delivery information due to the fact that interrupted transmissions can be restarted at the point of interruption, it also provides a system for the request of information from the sender in blocks which are determined by the receive side.

While the subject system has been described as having a single send and a single receive side, in one embodiment, the receiver can respond to multiple servers simultaneously. This permits transmission of a given file from more than one server to the receive side so that if a link is broken between a particular server and client, the client can nonetheless receive the same data from another server, with the start up of being accomplished in the manner described above.

Note also that since the client bandwidth is much larger than that of the server, it possible to simultaneously transmit the same file from multiple servers, thus to eliminate bandwidth limitations. This problem occurs most frequently when there are extremely loaded servers, which limits the bandwidth on the server side as opposed to the client side. While not rare, this is less of a problem. This problem occurs most frequently in a client server scenario such as NETSCAPE, in which the server, NETSCAPE, can not keep up with the demand for information from its associated client. It is often times the case, the FTP server at NETSCAPE is required to download the NETSCAPE content simultaneously which results in an overload condition at the server. Where it is possible to transmit the same information from multiple servers, then this problem is eliminated because the subject system requires only that which has not been transmitted from one server to be transmitted from a non-down server. This assumes the file signatures are identical and the data is identical with the data being deposited at multiple servers.

In the case of NETSCAPE's web server at WWW.NETSCAPE.COM, it is clear that users seek multiple connections to the server, with the server being unable to select which connections to serve. As a result, the server tries to send data to each of the receivers. This leads to significant overhead for the switches and the links and the servers themselves. With the utilization of the subject system and its attendant protocol, this situation can be avoided by interrupting the sending of information in peek periods until such time as the number of users seeking connections is decreased. The effect of interrupting the transmission is to delay the transmission such that data transfer from sender to receiver is both efficient and non-annoying.

Having now described a few embodiments of the invention, and some modifications and variations thereto, it should be apparent to those skilled in the art that the foregoing is merely illustrative and not limiting, having been presented by the way of example only. Numerous modifications and other embodiments are within the scope of one of ordinary skill in the art and are contemplated as falling within the scope of the invention as limited only by the appended claims and equivalents thereto.

What is claimed is:

1. A system for resuming an interrupted transmission of a file over a network, comprising:

a sending node comprising a file comprising a plurality of data portions and a processor executing a first application program, the first application program comprising a calculator module that generates a signature uniquely associated with the file; and a receiving node receiving the signature and an incomplete copy of the file over the network from the sending node, the receiving node comprising a processor executing a second application program and memory storing a data record identifying the file as incompletely received by the receiving node, the data record including an indicator identifying an unreceived data portion of the file;

wherein the second application program executing on the receiving node requests transmission of the unreceived data portion identified by the indicator in response to determining from the signature and the data record that the receiving node lacks a complete copy of the file.

2. The system of claim 1 wherein said receiving node stores in the memory signatures associated with files incompletely received by the receiving node and further comprises a comparator, said comparator comparing said signature received from said sending node with the signatures stored in the memory to determine whether the receiving node has an incomplete copy of the file.

3. The system of claim 1 wherein the indicator identifies a position of the unreceived data portion in the file.

4. The system of claim 1 wherein the request for transmission of the unreceived data portion is a request for transmission of a block of unreceived data portions starting with the unreceived data portion identified by the indicator.

5. The system of claim 1 wherein the indicator represents a count of the number of data bytes of the file at the receiving node.

6. The system of claim 5 wherein the signature comprises an indicator of the size of the file and the receiving node continues to request transmission of unreceived data portions as long as the file size indicator is greater in value than the count of the number of data bytes received.

7. The system of claim 1 further comprising:

a second sending node in communication with the receiving node over the network, the second sending node comprising a copy of the file and a processor executing a third application program;

wherein the third application program executing on the second sending node responds to the request by transmitting the unreceived data portion to the receiving node.

8. The system of claim 1 wherein the signature includes an indicator of a size of the file and the receiving node further comprises a comparator comparing the indicator of the file size with the indicator of the data record to determine if the receiving node has received all data portions of the file.

9. The system of claim 8 wherein said receiving node comprises a clock and establishes the time of an interruption in said receipt of said file, and wherein said receiving node determines a block of unreceived data portions to request in response to said file size and the time of said interruption in said receipt of said file.

10. The system of claim 1 further comprising a database in communication with the second application program executing on the receiving node, the database storing records identifying files incompletely received by the receiving node and including the data record.

11. A method for resuming transmission of a file having data portions over a network, comprising the steps of:

receiving at a receiving node a signature uniquely associated with the file;

maintaining by the receiving node a data record identifying the file as incompletely received by the receiving node and including an indicator identifying an unreceived data portion of the file; and determining by the receiving node in response to the signature and the record that the receiving node lacks a complete copy of the file; and requesting by the receiving node transmission of the unreceived data portion identified by the indicator in response to determining that the receiving node lacks a complete copy of the file.

12. The method of claim 11 further comprising the steps of determining the time at which transmission of data portions of the file from said sending node to said receiving node is interrupted and wherein said request by said receiving node is made in response to said time at which said transmission of data portions is interrupted.

13. The method of claim 11 wherein the step of determining whether the receiving node lacks a complete copy of the file comprises the step of determining whether said received signature corresponds to a stored signature on said receiving node.

14. The method of claim 13 further comprising the step of opening a new file on said receiving node if said signature received from said sending node does not correspond to a signature stored on said receiving node.

15. The method of claim 11 further comprising the steps of:

detecting by the receiving node an interruption in the receipt of the copy of the file;

establishing a connection between a sending node and the receiving node; and transmitting the signature from the sending node to the receiving node after establishing the connection.

16. The method of claim 11 further comprising the steps of:

providing an indicator of a size of the file in the signature; and comparing, by the receiving node, the indicator of the file size with the indicator of the data record to determine if the receiving node has received all data portions of the file.

17. The method of claim 11 comprising the step of requesting a block of unreceived data portions starting with the unreceived data portion identified by the indicator.

18. The method of claim 17 further comprising the steps of:

(a) receiving the block of unreceived data portions;

(b) updating the indicator of the data record in response to the received block of unreceived data portions; and (c) requesting transmission of a subsequent block of unreceived data portions; and (d) repeating the steps of (a), (b), (c) until the receiving node receives all unreceived data portions.

19. The method of claim 17 wherein each requested block of unreceived data portions includes a constant number of data portions.

20. The system of claim 17 wherein a number of unreceived data portions in each requested block of unreceived data portions varies from block to block.

21. The method of claim 11 further comprising the steps of maintaining a database of records identifying incompletely received files and storing the data record in the database.

* * * * *